April 12, 1955 A. P. DOUGLAS ET AL 2,706,135
WHEEL CONSTRUCTION
Filed May 20, 1950

INVENTOR.
ALVIN P. DOUGLAS
LEONARD J. WALTERS
BY
*Fay, Golrick & Fay*
ATTORNEYS

2,706,135

WHEEL CONSTRUCTION

Alvin P. Douglas, Cleveland, and Leonard J. Walters, Shaker Heights, Ohio, assignors to The Murray Ohio Manufacturing Company, Cleveland, Ohio, a corporation of Ohio Application May 20, 1950, Serial No. 163,252

3 Claims. (Cl. 301—63)

This invention relates to improvements in the structure of wheels, particularly wheels for juvenile vehicles and toys. The general object of this invention is the provision of a new and improved pressed steel structure for wheels. Another object is the provision of a ball bearing structure in wheels for juvenile vehicles which is simple and of low cost in manufacture.

Another object is the provision of an improved and low cost swivel construction in wheels for juvenile vehicles.

Another object is to provide an improved mounting structure for swivel wheels in juvenile vehicles.

Another object is to provide a method of manufacturing wheels embodying the aforementioned improvements.

Still further objects and advantages will appear in the following description and drawings in which.

Figure 1:
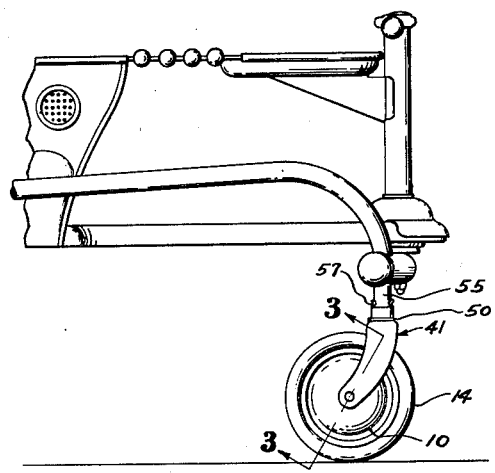
Fig. 1 is a side view of the wheel of this invention as mounted on a child's vehicle generally known as a baby walker.
Figure 2:
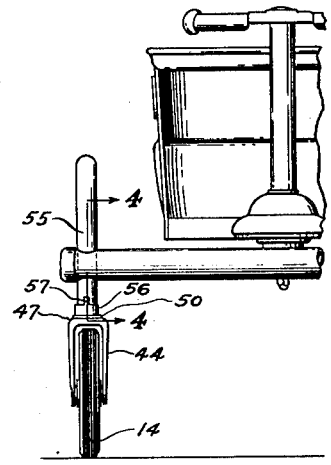
Fig. 2 is a front view corresponding to Fig. 1.
Figure 4:
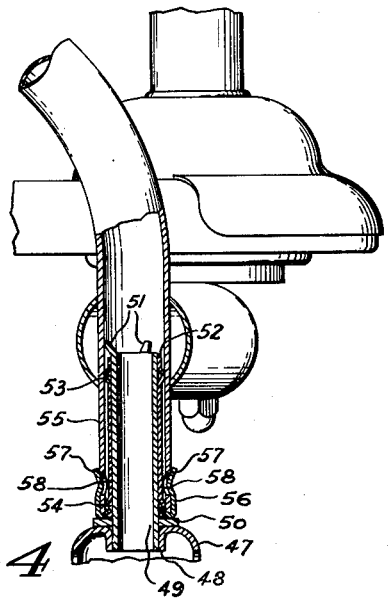
Fig. 4 is a cross-section and detailed view of the swivel mounting taken at 4—4 in Fig. 2.
Figure 3:
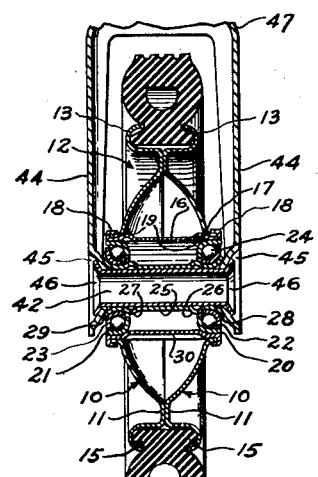
Fig. 3 is a cross-section of this invention taken along the line 3—3 in Fig. 1.
Figure 5:
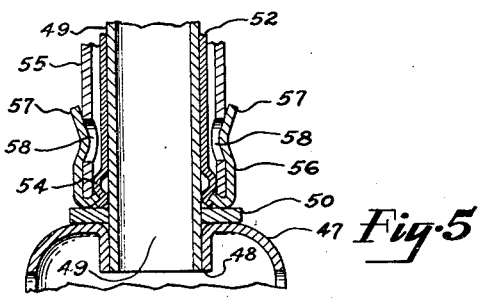
Fig. 5 is an enlarged sectional view corresponding to the lower part of Fig. 4.

The wheel proper of this invention, best described by reference to Figs. 1 and 3, comprises a pair of similar, centrally apertured, dish-like side disks 10 of pressed metal, which may, but need not be joined by spot-welding at 11, a circumferential channel 12, formed by the oppositely disposed flanges 13 on the two disks; a tire 14 held on the wheel by the flanges 13 grasping the oppositely extending inner circumferential tire flanges or beads 15, and a hub sleeve or outer sleeve 16 extending through the central apertures of the side disks 10.

The central apertures of the disks 10 are formed with oppositely disposed, outwardly extending circumferential flanges 17, which are enclosed in and restrained from outward displacement by the beaded over ends 18 of the outer sleeve 16. The outwardly radial projection 19, formed on outer sleeve 16 in two circumferential series by nibbing out the metal at points inward from each end of the sleeve, space and support the central area of the side disks. The bearing structure comprises the outer bearing races 20 and 21, press fitted into the ends of outer sleeve 16, the inner bearing races 22 and 23, ball bearings 24, and the outer axle sleeve 25, provided with the two circumferential ridges 26 and 27 to space the inner races from each other and outwardly expanded ends 28 and 29 to retain the inner races in place. A plurality of longitudinal ridges 30, disposed around the hub sleeve 16 and projecting inward, serve as spacing stops for the outer races 20 and 21 which abut the ends of the ridges. A plurality of ridges similar to these ridges 30, but projecting outwardly, may be used in place of projections 19 to space the side disks.

The bifurcated swivel member 41, formed of pressed metal, carries a hollow shaft 42, passed through the wheel hub and apertures in the fork sides 44. The apertures are centrally located in the bottoms of the circularly depressed positions 45 which form inward bosses on the sides 44, and the ends 46 of the shaft tube 42 are expanded outwardly to hold the depressed portions 45 against the expanded ends of the outer axle sleeve 25, which serves as an inner race retainer. The top end or yoke 47 has an inwardly flanged aperture 48, into which the tubular swivel or caster stem 49 is pressed and brazed.

A flat collar or washer 50 around the stem 49 is welded or brazed to yoke and stem. End projections 51 on the stem 49 are bent outwardly somewhat to retain thereon a swivel bearing sleeve 52, provided with upper and lower circumferential ridges 53 and 54 formed in the metal to space the stem 49 from the inside of the end of tubular vehicle frame member 55 which serves as a socket to receive the swivel stem assembly. The bottom end of the sleeve 52, which passes through a central aperture of the inwardly depressed bottom of the cup-shaped collar or cap 56, is expanded outwardly to hold the bottom of cap 56 firmly against the bottom spacing ridge 54. The cap 56 receives the end of tubular frame member 55, and holds the swiveled wheel thereon by means of the pair of lugs or ears 57 which are crimped or bent into a corresponding pair of diametrically disposed holes 58 located toward the end of tubular frame member 55.

The structure of the wheel is such that it is adapted to low cost volume manufacturing procedure. The disk 10, outer bearing races 20 and 21, inner races 22 and 23, fork member 41 and collar 56 may all be stamped or pressed from sheet steel, while the sleeves 16, 26 and 52 may be formed from steel strip, which is formed with the necessary circumferential ridges or shoulders and rolled into tubular form without welding the joint by common methods known to the metal working art.

In the production of the wheel itself, the side disks 10 are slid loosely onto the ends of hub sleeves 16 with the tire 14 therebetween, and after the tire is lined up with its flanges 15 between the disk flanges 13, the ends of the outer sleeve 16 are beaded over outwardly projecting central flanges 17 of the disks. In the production of the bearing structure, the outer races 20 and 21 are first pressed into place in the ends of the outer sleeve 16. The outer axle sleeve 25, fitted at one end with an inner race, say inner race 22, is maintained in a fixture in vertical position with the race 22 in bottommost position, while the successive operations are performed of placing the requisite number of balls 24 in the inner race 22, positioning thereover a wheel already provided with outer races, fitting the inner race 23 over the top end of the outer axle sleeve 25, inserting the balls 24 between inner race 23 and outer race 21, and lastly, simultaneously expanding the ends 28 and 29 of sleeve 25 outwardly against the inner races 22 and 23.

The tubular swivel stem 49 is press fitted into the flanged aperture in the yoke of the fork member 41, which is pressed from sheet metal. The flat washer or collar 50 is put on the stem and the three pieces brazed together at the yoke 47. The swivel bearing sleeve unit, formed by rolling blanks to tubular form with the circumferential ridges 53 and 54, and then expanding the end of sleeve 52 to hold thereon the cap 56, is then put on the swivel stem 49, on which it is retained by bending the stem end projections or ears 51 outwardly. The wheel is mounted in the swivel fork by merely passing the tubular shaft 42 through the wheel and the apertures in the fork side members 44, and then expanding the shaft ends 46 in the depressed portions 45 of the side members 44 to hold the side members firmly against the expanded ends 28 and 29 of the outer axle sleeve 25. A swivel wheel of this construction is mounted in the end of such a vehicle frame member as member 55 by merely inserting the sleeved swivel stem therein and pinching the cap ears 57 into the aperture 58.

Several advantages are obtained by the disclosed structure both during the manufacturing thereof and in the use thereof. The completely assembled caster wheel with its swivel bearing can be accurately made and assembled at the point of manufacture without involving expensive machining operations. The swivel bearing sleeves are prevented from misplacement by being permanently retained by the relatively heavy lugs 51. By having the external formation 56 on the bearing sleeve, visible retaining lugs 57 can be used and tight fitting of the swivel sleeve within the obscurity of the tube is avoided. If desired the sleeve may be formed of a metal different than that of the thrust washer portion 50 of the fork structure for anti-friction purposes and the lower end of the sleeve forms a thrust bearing. It has been found that wobbles and looseness in the swivel mounting can be avoided without resorting to the use of more expensive forms of swivel bearings and the caster effects are smooth and silent. The ball bearing construction can be definite and permanent and all possibility of early deterioration due to the loosening of threaded axle parts is avoided. Furthermore, the particular shapes of the various elements comprising the hub, the bearing and the axle mountings are such that the respective elements can be assembled in the order stated by metal beading and pressing operations which do not result in tightness in the bearings.

Though the preferred sequence of operations in assembling such a wheel is here given, obviously substantially the same structure may be obtained by some modifications in the manufacturing sequence.

We claim:

1. A wheel for juvenile vehicles and the like comprising a pair of similarly spaced, outwardly dished sheet metal side disks abutting at rim portions on inner faces thereof, each of said disks having a central aperture formed with an outwardly extending cylindrical flange, and said disks having rim flanges adapted cooperatively to engage a tire at its inner circumference; a hub sleeve extending between and through said disks with the ends reflexly beaded over the outer edge of the flanges of said apertures to hold the disks together, said hub sleeve being provided inwardly of each beaded end with circumferentially ordered external projections to support and space the inner faces of said disks and with circumferentially ordered internal projections; cup type outer ball bearing races pressed into each end of said hub sleeve with the inner ends thereof bearing against and supported by said internal projections of the hub sleeve; ball bearings in said outer races and inner races thereover, an inner race retaining sleeve passed through and having its ends expanded outwardly against the said inner races, and a third sleeve fixed within the inner race retaining sleeve having the ends thereof adapted to and shaped to maintain a fork prong in fixed relation to the outwardly expanded end of the inner race retaining sleeve.

2. A wheel for juvenile vehicles and the like comprising a pair of similarly spaced, outwardly dished side disks abutting at rim portions on inner faces thereof, each of said disks having a central aperture formed with an outwardly extending cylindrical flange, and said disks having rim flanges adapted cooperatively to engage a tire at its inner circumference; a hub sleeve extending between and through said disks with the ends reflexly beaded over the outer edges of the flanges of said apertures to hold the disks together, said hub sleeve being provided inwardly of each beaded end with circumferentially ordered internal projections; cup type outer ball bearings races pressed into each end of said hub sleeve with the inner ends thereof bearing against and supported by said internal projections of the hub sleeve; ball bearings in said outer races and inner races thereover, each said inner race including as bearing surfaces a cylindrical wall portion and an outwardly extending radial flange at the outer end of the wall portion; and an inner race retaining sleeve passed through and having its ends expanded outwardly against the flanges of the said inner races, said retaining sleeve having circumferentially arranged external projections inwardly of the ends thereof against which the inner ends of the wall portions of said inner races abut to hold the inner races in spaced relation, and a third sleeve fixed within the inner race retaining sleeve having the ends thereof adapted to and shaped to maintain a fork prong in fixed relation to the outwardly expanded end of the inner race retaining sleeve.

3. A wheel for juvenile vehicles and the like comprising a pair of similarly spaced, outwardly dished side disks abutting at rim portions on inner faces thereof, each of said disks having a central aperture formed with an outwardly extending cylindrical flange, and said disks having rim flanges adapted to cooperatively engage a tire at its inner circumference; a hub sleeve extending between and through said disks with the ends reflexly beaded over the outer edges of the flanges of said apertures to hold the disks together, said hub sleeve being provided inwardly of each beaded end with circumferentially ordered external projections to support and space the inner faces of said disks and with circumferentially ordered internal projections; cup type outer ball bearing races pressed into each end of said hub sleeve with the inner ends thereof bearing against and supported by said internal projections of the hub sleeve; ball bearings in said outer races and inner races thereover, each said inner race including as bearing surfaces a cylindrical wall portion and an outwardly extending radial flange at the outer end of the wall portion; and an inner race retaining sleeve passed through and having its ends expanded outwardly against the flanges of the said inner races, said retaining sleeve having circumferentially arranged external projections inwardly of the ends thereof against which the inner ends of the wall portions of said inner races abut to hold the inner races in spaced relation, and a third sleeve fixed within the inner race retaining sleeve having the ends thereof adapted to and shaped to maintain a fork prong in fixed relation to the outwardly expanded end of the inner race retaining sleeve.

References Cited in the file of this patent

UNITED STATES PATENTS

| Number | Name | Date |
|---|---|---|
| 504,208 | Fox | Aug. 29, 1893 |
| 614,166 | Fox | Nov. 15, 1898 |
| 1,448,312 | Nauts | Mar. 13, 1923 |
| 1,476,968 | Herle | Dec. 11, 1923 |
| 1,481,484 | Rieske | Jan. 22, 1924 |
| 1,487,552 | Franz | Mar. 18, 1924 |
| 1,537,391 | Wagner | May 12, 1925 |
| 1,619,590 | Tanner | Mar. 1, 1927 |
| 1,750,278 | Moyer | Mar. 11, 1930 |
| 1,855,315 | Schacht | Apr. 26, 1932 |
| 2,181,722 | Butter et al. | Nov. 28, 1939 |
| 2,304,378 | Scudder et al. | Dec. 8, 1942 |